United States Patent [19]

Kashihara et al.

[11] Patent Number: 5,773,087
[45] Date of Patent: Jun. 30, 1998

[54] COATED ARTICLE AND METHOD FOR PRODUCING SAME

[75] Inventors: Hideki Kashihara; Katsuya Yamada, both of Osaka, Japan

[73] Assignee: Sumitomo Electric Industries, Ltd., Osaka, Japan

[21] Appl. No.: 695,212

[22] Filed: Jul. 29, 1996

Related U.S. Application Data

[62] Division of Ser. No. 977,039, Nov. 16, 1992, abandoned.

[30] Foreign Application Priority Data

Nov. 15, 1991 [JP] Japan ................................. 3-354107

[51] Int. Cl.$^6$ ................................ B05D 3/12; C25D 5/36
[52] U.S. Cl. ..................... 427/292; 205/206; 205/208; 205/209; 205/210; 205/218; 205/219; 427/309; 427/318; 427/327
[58] Field of Search ..................................... 428/421, 422, 428/324, 463, 469, 367, 368; 205/214, 218, 219, 206, 208, 209, 210; 427/292, 309, 318, 327

[56] References Cited

U.S. PATENT DOCUMENTS

| | | | |
|---|---|---|---|
| 3,451,856 | 6/1969 | Fraase et al. | 205/218 |
| 4,177,320 | 12/1979 | Yoshimura et al. | 428/422 |
| 4,422,906 | 12/1983 | Kobayashi | 205/219 |
| 5,106,682 | 4/1992 | Matsushita et al. | 428/421 |
| 5,194,336 | 3/1993 | Yamada | 428/421 |
| 5,240,775 | 8/1993 | Tannenbaum | 428/422 |

FOREIGN PATENT DOCUMENTS

| | | |
|---|---|---|
| 4031037 | 2/1992 | Japan . |
| 4094768 | 3/1992 | Japan . |
| 4150976 | 5/1992 | Japan . |
| 1358428 | 3/1974 | United Kingdom . |

*Primary Examiner*—D. S. Nakarani
*Attorney, Agent, or Firm*—Sughrue, Mion, Zinn, Macpeak & Seas, PLLC

[57] ABSTRACT

A coated article comprising a stainless steel base having an etched surface and having on the etched surface a coated layer. The coating layer may comprise a fluororesin and can be provided: after sensitizing the stainless steel base through heating, treating with an acid, subjecting to etching, and subjecting to a solution treatment; after immersing in an aqueous acid solution or an aqueous ferric chloride solution to cause the base to be dissolved to such an extent that the gloss of the surface disappears; after uniformly abrading the surface of the base through buffing or blasting to the weight corresponding to a thickness of 1.0 $\mu$m or more of the base, immersing in an aqueous acid solution or an aqueous ferric chloride solution to cause the base to be dissolved to such an extent that the gloss of the surface disappears, and subjecting to etching; or after subjecting to electrolytic etching at 15° C. or less.

18 Claims, No Drawings

COATED ARTICLE AND METHOD FOR PRODUCING SAME

This is a Divisional of application Ser. No. 07/977,039 filed Nov. 16, 1992, now abandoned.

FIELD OF THE INVENTION

The present invention relates to a coated article in which water repellency, anti-sticking property and stain resistance are imparted to the stainless steel base and the coating on the base has good adhesion to the base and excellent heat-resistance. The present invention also relates to a method for producing the above-mentioned coated article.

BACKGROUND OF THE INVENTION

As articles in which water repellency, anti-sticking property and stain resistance are imparted to the stainless steel base used therein, fluororesin-coated articles in which the fluororesin composition used as a coating contains a binder, such as a polyamideimide resin, in an amount of 20% by weight or more based on the amount of the fluororesin are conventionally known.

However, these conventional fluororesin-coated articles are disadvantageous in that:

(i) the anti-sticking property thereof is insufficient since the amount of the fluororesin constituent present in the coated layer is small;

(ii) when the articles comprising a planar stainless steel base having a coating thereon are subjected to a processing such as pressing, bending or the like, the adhesion of the coating to the base is insufficient; and (iii) the coating on the surface of the base cannot stand extension generated in the processing, resulting in the development of cracks and pinholes in the coating.

SUMMARY OF THE INVENTION

An object of the present invention is to provide a coated article in which excellent properties of the material of the coated layer are imparted to the stainless steel base used therein and in which coating on the surface of the base has good adhesion to the base.

Another object of the invention is to provide a method for producing the above-mentioned coated article.

Other objects and effects of the present invention will be apparent from the following description.

According to the present invention, the durability of the article is improved because of the increased adhesion of the coating to the surface of the base as compared to the adhesion in the conventional articles. Also, according to the present invention, post-processability can be imparted to the coated article, while the conventional articles is generally difficult to be subjected to post-processing thereon after the application of the coating.

The present invention provides, as a first aspect, a coated article comprising a stainless steel base having an etched surface and having on said etched surface a coated layer.

The present invention provides, as a second aspect, a method for producing the coated article according to the first aspect of the present invention, the method comprising the steps of: subjecting a planar stainless steel base to etching; coating the etched surface of the stainless steel base with a coated layer; and shaping the coated stainless steel base to a desired configuration, for example, by pressing, bending or the like.

The present invention provides, as a third aspect, a method for producing the coated article according to the first aspect of the present invention, the method comprising the steps of: sensitizing a stainless steel base through heating; treating the sensitized stainless steel base with an acid; subjecting the resulting treated stainless steel base to etching; subjecting the etched stainless steel base to a solution treatment through heating at 1,000° to 1,100° C.; and providing on the resulting etched surface of the stainless steel base a coated layer.

The present invention provides, as a fourth aspect, a method for producing the coated article according to the first aspect of the present invention, the method comprising the steps of: immersing a stainless steel base in an aqueous acid solution or an aqueous ferric chloride solution to cause the base to be dissolved to such an extent that the gloss of the surface of the base disappears; subjecting the resulting stainless steel base to electrolytic etching; and providing on the resulting etched surface of the stainless steel base a coated layer.

The present invention provides, as a fifth aspect, a method for producing the coated article according to the first aspect of the present invention, the method comprising the steps of: uniformly abrading the surface of a stainless steel base, through buffing or blasting, to the weight corresponding to a thickness of 1.0 μm or more of the base; immersing the resulting stainless steel base in an aqueous acid solution or an aqueous ferric chloride solution to cause the base to be dissolved to such an extent that the gloss of the surface of the base disappears; subjecting the resulting stainless steel base to electrolytic etching; and providing on the etched surface of the stainless steel base a coated layer.

The present invention provides, as a sixth aspect, a method for producing a coated article according to the first aspect of the present invention, the method comprising the steps of: subjecting a stainless steel base electrolytic etching at 15° C. or less; and providing on the etched surface of the stainless steel base a coated layer.

The present invention provides, as a seventh aspect, a method for producing a coated article according to the first aspect of the present invention, the method comprising the steps of: subjecting a stainless steel base electrolytic etching using a mixed aqueous solution of sulfuric acid and sodium chloride; and providing on the etched surface of the stainless steel base a coated layer.

The present invention provides, as an eighth aspect, a method for producing a coated article according to the first aspect of the present invention, the method comprising the steps of: subjecting a stainless steel base electrolytic etching at 15° C. or less and using a mixed aqueous solution of sulfuric acid and sodium chloride; and providing on the etched surface of the stainless steel base a coated layer.

DETAILED DESCRIPTION OF THE INVENTION

The stainless steel used in the fluororesin-coated article according to the present invention may be any of ferrite-type (SUS 430), austenite-type (SUS 304) and martensite-type (SUS 410) stainless steels, and is not specifically limited. Among these, ferrite-type stainless steel is preferably used in the present invention. The shape of the stainless steel base is not particularly limited and may be a flat plate, a foil, a rod, a wire, etc.

The coated layer of the coated article according to the present invention is not particularly limited and may comprise rubber (e.g., urethane rubber), plastics (e.g., acrylic resins), ceramics (e.g., glass), metals (e.g., iron and aluminum), alloys (e.g., aluminum alloys), etc. In the present invention, a coated layer comprising rubber or plastics are preferably employed. A coated layer comprising a fluororesin alone or a layer comprising a fluororesin composition containing a fluororesin and a filler is particularly preferred.

In the following description, a fluororesin-coated layer, which comprises a fluororesin alone or a layer comprising a fluororesin composition containing a fluororesin and a filler, is mainly described, but the present invention is not construed as being limited to the fluororesin-coated layer.

Examples of the fluororesin which can be used in the present invention include PTFE (polytetrafluoroethylene), PFA (a tetrafluoroethylene-perfluoroalkyl vinyl ether copolymer), FEP (a tetrafluoroethylene-hexafluoropropylene copolymer), ETFE (a tetrafluoroethylene-ethylene copolymer), CTFE (polychlorotrifluoroethylene), PVdF (polyvinylidene fluoride), and copolymers thereof. Among these, PTFE, PFA, FEP and ETFE are preferably used in the present invention.

In a preferred embodiment of the present invention, the fluororesin-coated layer contains a filler. Examples of the filler which can be included in the fluororesin composition include common inorganic pigments such as mica, carbon, titanium oxide, iron oxide, graphite or the like to improve an appearance such as color, gloss or the like; and heat-resistance plastics such as polyamideimides, polyether sulfones, polyphenylene sulfide, polyimides or the like to enhance the adhesion of the coating to the stainless steel base. Among these, mica, carbon and titanium oxide are preferred as an inorganic pigment; and polyamideimide and polyether sulfones are preferred as heat-resistant plastics. These fillers may be used independently or in combination.

The amount of the filler is preferably less than 20% by weight, more preferably from 3 to 15% by weight, particularly preferably from 5 to 12% by weight, based on the amount of the fluororesin used in the fluororesin composition. If the amount of the filler added exceeds 20% by weight, while the appearance of the coated article, such as color and gloss, is further improved, the anti-sticking property of the surface of the fluororesin-coated article tends to reduce, and the obtained coating on the surface of the base sometimes cannot stand elongation of the base generated in the pressing or bending of the planar base, resulting in the development of cracks and pinholes in the coating.

Examples of the etching solution which can be used for etching in the present invention include an aqueous ferric chloride solution (Baume concentration of 42), hydrochloric acid (5 to 15%), sulfuric acid (1 to 5%), an aqueous sodium chloride solution (2 to 10%), aqueous hydrogen fluoride (1 to 30%), and an aqueous cupric chloride solution (1 to 15%). These solutions may be used independently or in combination therebetween in appropriate proportions.

Particularly preferably, a mixed aqueous solution of sulfuric acid and sodium chloride, most preferably an aqueous solution containing 2% of sulfuric acid and 3% of sodium chloride, is used as the etching solution, since it creates extremely fine unevenness on the surface of the stainless steel base. Stabilization of the pH value of the solution and the formation of finer and more uniform unevenness on the surface of the stainless steel base can be attained by adding, to the above-exemplified solution or mixed solution, nitric acid, glycerine, aqueous hydrogen peroxide, chromic acid, ethyl alcohol, acetic acid, potassium hydroxide, picric acid, ammonia, copper sulfate, iron sulfate, potassium ferricyanide, oxalic acid, and mixtures thereof.

The etching is conducted by immersing the stainless steel base in the etching solution to make it a positive electrode, placing a negative electrode opposite to the positive electrode in the solution and applying a voltage between the positive and negative electrodes. In order to form sufficient unevenness on the surface of the stainless steel base, it is preferred to set the voltage and the etching time in such a manner that a quantity of electricity of 20 $C/cm^2$ or more migrates on the surface of the stainless steel base.

The temperature of the etching solution is preferably 15° C. or less during the etching. By conducting the etching at 15° C. or less, the unevenness generated by the etching can be still finer and still more uniform.

The stainless steel base to be etched is generally first cleaned with an organic solvent such as methyl ethyl ketone, acetone or the like, or with an aqueous alkaline solution such as a 10% aqueous sodium hydroxide solution or the like, so that dusts and oily substances which adhere to the surface of the base are removed sufficiently, thereby to ensure the uniform etching.

After the etching, the resulting stainless steel base is preferably treated (e.g., by immersing in an acid such as nitric acid) to form a passive film on the surface of the base.

In order to form finer and more uniform unevenness on the surface of the stainless steel base, it is preferred that a passive film present on the surface of the stainless steel base is substantially removed prior to etching. The removal of a passive film can be conducted by (1) carrying out a sensitizing heat treatment on the stainless steel base, (2) abrading by buffing the surface of the base with a buff such as "Scotch Bright" (a trade name of Sumitomo 3M Corp.) or the like, or (3) abrading by blasting the surface of the base. These processes (1) to (3) of removing a passive film may be used independently or in combination.

The sensitizing heat treatment can be carried out by a heat treatment at 400° to 850° C. for about an hour followed by cooling in the case of an austenite-type stainless steel, or by heating to 850° C. or more followed by cooling in the case of a ferrite-type stainless steel, thereby depositing chromium carbides at the grain boundaries in the stainless steel base. This results in the shortage of chromium near the grain boundaries, so that the corrosion resistance of the stainless steel base is reduced. Consequently, treating of the resulting stainless steel base with an acid such as nitric acid causes peeling-off of the grain boundaries, resulting in the formation of unevenness on the surface of the stainless steel base. The surface of the base is then etched, and the corrosion thus proceeds along the grain boundaries to form complicated and finer unevenness on the surface. However, cracks are likely to be developed in the pits in the thus-formed unevenness along the grain boundaries, resulting in the increased tendency to generate stress-corrosion cracks in the stainless steel base. The stainless steel base is then heat-treated at 1,000° to 1,100° C. for several minutes (this is called "solution treatment") to make the chromium carbides, which are deposited at the grain boundaries, returned to the form of a solid solution. Thus, the material is restored to the original stainless steel. The cracks still remain at this stage. Consequently, the unevenness generated by the corrosion of the grain boundaries is combined with the unevenness generated by the etching, resulting in the formation of the complicated and finer unevenness, which provides a sufficient anchoring effect in applying the fluororesin layer to the stainless steel base.

The buff which can be used in abrading the surface of the stainless steel base in the fluororesin-coated article according to the present invention is not particularly limited, but is preferably those in which the fibers used therein are hard and which contains an abrasive, such as "Scotch Bright" a trade name of Sumitomo 3M Corp.

The blasting agent which can be used in abrading in the present invention is not particularly limited. For example, the blasting may be carried out by blowing glass beads having a size of approximately #100 or lapilli having a size of approximately #20 onto the surface of the base at a pressure of from 0.5 to 5 $kg/cm^2$, preferably about 1 $kg/cm^2$, thereby partly removing the passive film formed on the surface of the base and roughening the surface of the base.

The loss of weight of the stainless steel base by abrading is preferably in an amount corresponding to a thickness of 1.0 $\mu$m or more of the base.

Although the aqueous acid solution which can be used for the treatment by immersion after abrading and before the etching is not particularly limited, the use of hydrochloric acid, sulfuric acid, phosphoric acid, aqueous hydrogen fluoride, chromic acid or a mixture thereof as the aqueous acid solution enables uniform and rapid dissolving of the surface layer of the base. When an aqueous ferric chloride solution is used for the treatment before the etching, a solution having a Baumé concentration of 42 is preferably used.

Thus, the surface of the stainless steel base is dissolved to such an extent that the gloss of the surface disappears, resulting in complete removal of the passive film formed on the surface of the stainless steel base. This enables the formation of the uniform etched surface of the stainless steel base through the etching and avoidance of the locally reduced adhesion of the subsequently formed fluororesin coating. Further, if a fluororesin containing no filler is coated, the formation of color unevenness can be prevented by the removal of the passive film. The removal of the passive film is accelerated due to the fact that the above removal is done after the buffing or blasting.

The above treatment of immersing in the aqueous acid solution or aqueous ferric chloride solution can be effected without abrading, followed by etching.

The present invention will be described in more detail below by referring to the specific examples and comparative examples, but the present invention is not construed as being limited thereto. All the ratios, percents and the like in the examples and comparative examples are in terms by weight unless otherwise indicated.

EXAMPLE 1

Stainless steel plates made of the respective materials listed in Table 1 and having a thickness of 0.4 mm were used as a base. The stainless steel plates were cleaned by washing with methyl ethyl ketone.

The stainless steel plates for Sample Nos. 7 and 8 were subjected to a sensitizing heat treatment at 650° C. for 1 hour, treated with nitric acid, and then subjected to a solution treatment by heating to 1,050° C. for 10 minutes. The stainless steel plate for Sample No. 5 was subjected to the abrading with "Scotch Bright". The stainless steel plate for Sample No. 6 was subjected to the blasting with glass beads (#100).

The stainless steel plate thus-pretreated or non-pretreated, other than Sample Nos. 3, 4 and 5, were subjected to the etching using an aqueous solution containing 2% of $H_2SO_4$ and 3% of NaCl in such a manner that the quantity of electricity was 20 $C/cm^2$. In Sample Nos. 3, 4 and 5, the etching was omitted. The thus-etched or non-etched stainless steel plates were immersed in 10% nitric acid, resulting in the formation of a passive film on the surface of the plates, followed by drying.

The resulting plates were spin-coated with the resins having the respective formulations listed in Table 2, followed by drying and baking. The coated plates thus prepared were shaped into a pot by pressing and evaluated for the following properties. The results of the evaluation are shown in Table 2.

1. Peel Strength

A commercially available FEP sheet was heat-fused onto the coating surface of each sample and then peeled from the coating surface by a width of 1 cm in a direction of 180°. The force (kg/cm) required to peel the sheet was measured and taken as a peel strength. The peel strength was evaluated by the following three grades:

| | Grade | Peel strength (kg/cm$^2$) |
|---|---|---|
| A | Excellent | 2.1≦ |
| B | Good | 1.0–2.0 |
| C | Poor | <1.0 |

2. Cross-Cut Adhesion Test

The adhesion of the fluororesin coating was evaluated by the cross-cut adhesion test according to JIS K5400-1990, 8.5.2. Specifically, the coating surface of each sample was incised to form 100 tessellated cells thereon. Then, an adhesive cellophane tape ("Cello Tape", a trade name of Nichiban Corp.) was thoroughly adhered to the incised surface, and then immediately peeled from the surface. This procedure was repeated 40 times, using a new adhesive cellophane tape for each run. The number of remaining cells out of the 100 cells was counted to evaluate the adhesion. The results cross-cut adhesion test were evaluated by the following three grades:

| | Grade | Cross-cut adhesion |
|---|---|---|
| A | Excellent | 99/100≦ |
| B | Good | 80/100–98/100 |
| C | Poor | <80/100 |

3. Contact Angle with Water

A contact angle of a sample with pure water was determined by a sessile drop method, using a contact angle measurement apparatus available from Kyowa Kaimen Kagaku Corp. The contact angle with water was evaluated by the following three grades:

| | Grade | Contact angle with water |
|---|---|---|
| A | Excellent | 105°≦ |
| B | Good | 100°–104° |
| C | Poor | <100° |

4. Pinhole Degree

The sample in the form of a pot was filled with a 2.5% aqueous sodium chloride solution. The pot was designated as a cathode, and an electrode, which was placed into the solution, was designated as an anode. The a voltage of 10V was applied between the pot and the electrode for 5 seconds, and the magnitude of the current (mA) produced by the presence of the pinholes on the inner surface of the pot was measured in terms of current per unit surface area (mA/cm$^2$). The contact angle with water was evaluated by the following three grades:

| | Grade | Pinhole degree (mA/cm$^2$) |
|---|---|---|
| A | Excellent | <0.20 |
| B | Good | 0.20–0.80 |
| C | Poor | 0.08≦ |

TABLE 1

| Sample No. | Stainless steel | Pretreatment | Etching |
|---|---|---|---|
| 1 | SUS 430 | none | yes |
| 2 | SUS 430 | none | yes |
| 3* | SUS 430 | none | none |
| 4* | SUS 430 | none | none |
| 5* | SUS 430 | none | none |
| 6 | SUS 430 | none | yes |
| 7 | SUS 304 | sensitizing, nitric acid treatment, and solution treatment | yes |
| 8 | SUS 304 | sensitizing, nitric acid treatment, and solution treatment | yes |
| 9 | SUS 430 | abrading with Scotch Bright** | yes |
| 10 | SUS 430 | blasting with glass beads (#100)*** | yes |
| 11 | SUS 430 | none | yes |

Note:
*Sample Nos. 3, 4 and 5 were comparative samples.
**Loss of weight: 10 mg/cm$^2$
***Loss of weight: 15 mg/cm$^2$

TABLE 2

| Sample No. | Resin formulation | Peel strength (kg/cm) | | Cross-cut adhesion test | | Contact angle with water | | Pinhole degree (mA/cm$^2$) | |
|---|---|---|---|---|---|---|---|---|---|
| 1 | PTFE$^{(1)}$(100%) | B | 1.8 | B | 95/100 | A | 110° | A | 0.10 |
| 2 | PTFE(90%) + PES$^{(2)}$(10%) | A | 2.5 | A | 100/100 | B | 103° | B | 0.5 |
| 3* | PTFE(100%) | C | 0.2 | C | 0/100 | A | 110° | C | no data due to the peeling |
| 4* | PTFE(90%) + PES(10%) | C | 0.9 | C | 10/100 | B | 104° | C | no data due to the peeling |
| 5* | PTFE(80%) + PES(20%) | B | 1.8 | B | 90/100 | C | 98° | C | 1.10 |
| 6 | PTFE(80%) + PES(20%) | A | 3.2 | A | 100/100 | C | 98° | C | 1.00 |
| 7 | PTFE(100%) | A | 3.5 | A | 100/100 | A | 110° | A | 1.10 |
| 8 | PTFE(90%) + PES(10%) | A | 3.6 | A | 100/100 | B | 103° | B | 0.50 |
| 9 | PTFE(100%) | B | 2.0 | B | 98/100 | A | 110° | A | 0.10 |
| 10 | PTFE(100%) | B | 2.0 | B | 97/100 | A | 110° | A | 0.10 |
| 11 | PFA$^{(3)}$(100%) | B | 2.0 | B | 98/100 | A | 111° | A | 0.08 |

Note:
*Sample Nos. 3, 4 and 5 were comparative samples.
$^{(1)}$PTFE ("D-1F" produced by Daikin Industries, Ltd.)
$^{(2)}$PES ("EK-1208GY" produced by Daikin Industries, Ltd.)
$^{(3)}$PFA ("AD-2CR" produced by Daikin Industries, Ltd.)

EXAMPLE 2

Stainless steel plates made of SUS 430 having a thickness of 0.4 mm were used as a base. The stainless steel plates were cleaned by washing with methyl ethyl ketone.

The stainless steel plate for Sample No. 12 was subjected to abrading with "Scotch Bright" to the loss of weight corresponding to a thickness of 1.0 μm or more, and then immersed in 10% hydrochloric acid for 10 minutes. The stainless steel plate for Sample 13 was subjected to blasting with glass beads (#100) to the loss of weight corresponding to a thickness of 1.0 μm or more, and then immersed in 10% hydrochloric acid for 10 minutes. The stainless steel plate for Sample No. 15 was immersed in 10% hydrochloric acid for 10 minutes. The stainless steel plate for Sample No. 16 was subjected to abrading with "Scotch Bright" to the loss of weight corresponding to a thickness of 1.0 μm or more. The stainless steel plate for Sample No. 17 was subjected to blasting with glass beads to the loss of weight corresponding to a thickness of 1.0 μm or more. The stainless steel plate for Sample No. 18 was subjected to abrading with "Scotch Bright" to the loss of weight corresponding to a thickness of less than 1.0 μm, and then immersed in 10% hydrochloric acid for 10 minutes. The stainless steel plate for Sample No. 19 was subjected to blasting with glass beads (#100) to the loss of weight corresponding to a thickness of less than 1.0 μm, and then immersed in 10% hydrochloric acid for 10 minutes. The stainless steel plate for Sample No. 20 was subjected to abrading with "Scotch Bright" to the loss of weight corresponding to a thickness of less than 1.0 μm, and then immersed in an FeCl$_3$ aqueous solution having a Baumé concentration of 42 for 10 minutes. The stainless steel plate for Sample No. 21 was subjected to blasting with glass beads (#100) to the loss of weight corresponding to a thickness of 1.0 μm or more, and then immersed in an FeCl$_3$ aqueous solution having a Baumé concentration of 42 for 10 minutes. The stainless steel plate for Sample Nos. 22, 24 and 25 was subjected to abrading with "Scotch Bright" to the loss of weight corresponding to a thickness of 1.0 μm or more, and then immersed in 10% hydrochloric acid for 10 minutes. The stainless steel plate for Sample No. 23 was subjected to blasting with glass beads (#100) to the loss of weight corresponding to a thickness of 1.0 μm or more, and then immersed in 10% hydrochloric acid for 10 minutes. The pretreatments of the stainless steel plates are summarized in Table 3.

The stainless steel plate thus-pretreated or non-pretreated were subjected to the etching using an aqueous solution containing 2% of H$_2$SO$_4$ and 3% of NaCl in such a manner that the quantity of electricity was 20 C/cm$^2$. The thus-etched stainless steel plates were immersed in 10% nitric acid, resulting in the formation of a passive film on the surface of the plates, followed by drying.

The resulting etched plates were spin-coated with the resins having the respective formulations listed in Table 4, followed by drying and baking. The coated plates thus prepared were shaped into a pot by pressing and evaluated for the same properties as in Example 1. In addition, the surface appearance (uniformity) of the coated plates were evaluated with naked eye. When the etching could not be effected uniformly, color unevenness was formed on the etched surface. If a coating layer containing no filler was formed on the etched surface with color unevenness, the coated surface also had color unevenness. The surface appearance was evaluated by the following three grades:

A . . . No color unevenness

B . . . Substantially no color unevenness

C . . . Color unevenness

The results of the evaluations are shown in Tables 3 and 4.

TABLE 3

| Sample No. | Pretreatment | | Surface appearance (Uniformity) |
|---|---|---|---|
| 12 | Abrading with Scotch Bright* | 10% Hydrochloric acid | A |
| 13 | Blasting with glass beads* | 10% Hydrochloric acid | A |
| 14 | — | — | C |
| 15 | — | 10% Hydrochloric acid | B |
| 16 | Abrading with Scotch Bright* | — | C |
| 17 | Blasting with glass beads* | — | C |
| 18 | Abrading with Scotch Bright** | 10% Hydrochloric acid | B |
| 19 | Blasting with glass beads** | 10% Hydrochloric acid | B |
| 20 | Abrading with Scotch Bright** | FeCl$_3$ soln. | A |
| 21 | Blasting with glass beads* | FeCl$_3$ soln. | A |
| 22 | Abrading with Scotch Bright* | 10% Hydrochloric acid | A |
| 23 | Blasting with glass beads* | 10% Hydrochloric acid | A |
| 24 | Abrading with Scotch Bright* | 10% Hydrochloric acid | A |
| 25 | Abrading with Scotch Bright* | 10% Hydrochloric acid | A |

Note:
*Loss of weight in an amount corresponding to a thickness of 1.0 μm or more
**Loss of weight in an amount corresponding to a thickness of less than 1.0 μm of electricity was 20 C/cm$^2$. The etching solutions used were an aqueous solution containing 2% of H$_2$SO$_4$ and 3% of NaCl for Sample Nos. 26 to 29, 2% H$_2$SO$_4$ for Sample No. 30, 3% NaCl for Sample No. 31, and 2% HCl for Sample No. 32. The temperatures of the etching solution were varied as in Table 5. The thus-processed stainless steel plates were immersed in 10% nitric acid, resulting in the formation of a passive film on the surface of the plates, followed by drying. The resulting etched plates were spin-coated with PTFE ("D-1F" a trade name of Daikin Industries, Ltd.).

The coated plates thus prepared were shaped into a pot by pressing and evaluated for the same properties as in Example 1. The results of the evaluation are shown in Table 6.

TABLE 5

| Sample No. | Etching solution | Etching temperature (°C.) | Surface appearance |
|---|---|---|---|
| 26 | 2% H$_2$SO$_4$ + 3% NaCl | 10 | A |
| 27 | 2% H$_2$SO$_4$ + 3% NaCl | 15 | A |
| 28 | 2% H$_2$SO$_4$ + 3% NaCl | 20 | B |
| 29 | 2% H$_2$SO$_4$ + 3% NaCl | 30 | B |
| 30 | 2% H$_2$SO$_4$ | 10 | B |
| 31 | 3% NaCl | 10 | B |
| 32 | 2% HCl | 10 | B |

TABLE 6

| Sample No. | Peel strength (kg/cm) | Cross-cut adhesion test | Contact angle with water (degree) | Pinhole degree (mA/cm$^2$) |
|---|---|---|---|---|
| 26 | A 2.4 | A 100/100 | A 110 | A 0.10 |
| 27 | A 2.1 | A 99/100 | A 110 | A 0.10 |
| 28 | B 1.8 | B 95/100 | A 110 | A 0.10 |

TABLE 4

| Sample No. | Resin formulation | Peel strength (kg/cm) | | Cross-cut adhesion test | | Contact angle with water | | Pinhole degree (mA/cm$^2$) | |
|---|---|---|---|---|---|---|---|---|---|
| 12 | PTFE$^{(1)}$(100%) | A | 2.4 | A | 100/100 | A | 110 | A | 0.10 |
| 13 | PTFE (100%) | A | 2.5 | A | 100/100 | A | 110 | A | 0.10 |
| 14 | PTFE (100%) | B | 1.8 | B | 95/100 | A | 110 | A | 0.10 |
| 15 | PTFE (100%) | B | 2.0 | B | 98/100 | A | 110 | A | 0.10 |
| 16 | PTFE (100%) | B | 2.0 | B | 98/100 | A | 110 | A | 0.10 |
| 17 | PTFE (100%) | B | 2.0 | B | 97/100 | A | 110 | A | 0.10 |
| 18 | PTFE (100%) | A | 2.1 | A | 99/100 | A | 110 | A | 0.10 |
| 19 | PTFE (100%) | A | 2.1 | A | 98/100 | A | 110 | A | 0.10 |
| 20 | PTFE (100%) | A | 2.4 | A | 100/100 | A | 110 | A | 0.10 |
| 21 | PTFE (100%) | A | 2.5 | A | 100/100 | A | 110 | A | 0.10 |
| 22 | PTFE(90%) + PES$^{(2)}$(10%) | A | 3.5 | A | 100/100 | B | 103 | B | 0.50 |
| 23 | PTFE(90%) + PES(10%) | A | 3.4 | A | 100/100 | B | 103 | B | 0.50 |
| 24 | PFA$^{(3)}$(100%) | A | 2.6 | A | 100/100 | A | 110 | A | 0.10 |
| 25 | PTFE(80%) + PES(20%) | A | 3.8 | A | 100/100 | C | 98 | C | 1.00 |

Note:
$^{(1)}$PTFE ("D-1F" produced by Daikin industries, Ltd.)
$^{(2)}$PES ("EK-1208GY" produced by Daikin Industries, Ltd.)
$^{(3)}$PFA ("AD-2CR" produced by Daikin Industries, Ltd.)

EXAMPLE 3

Stainless steel plates made of SUS 430 and having a thickness of 0.4 mm were used as a base. The stainless steel plates were cleaned with methyl ethyl ketone, and then subjected to the etching in such a manner that the quantity TABLE 6-continued

| Sample No. | Peel strength (kg/cm) | Cross-cut adhesion test | Contact angle with water (degree) | Pinhole degree (mA/cm$^2$) |
|---|---|---|---|---|
| 29 | B 1.7 | B 93/100 | A 110 | A 0.10 |
| 30 | B 1.6 | B 90/100 | A 109 | A 0.10 |
| 31 | B 1.5 | B 90/100 | A 110 | A 0.10 |
| 32 | B 1.5 | B 90/100 | A 108 | A 0.10 |

EXAMPLE 4

Stainless steel base made of SUS 430 having a thickness of 0.4 mm were used as a base. The stainless steel plates were cleaned by washing with methyl ethyl ketone.

The stainless steel plates for Sample Nos. 33 and 34 were subjected to blasting with glass beads (#100) to the loss of weight corresponding to a thickness of 1.0 μm or more, and then immersed in an FeCl$_3$ aqueous solution having a Baumé concentration of 42 for 10 minutes. The stainless steel plates thus-pretreated were subjected to the etching using an aqueous solution containing 2% of H$_2$SO$_4$ and 3% of NaCl in such a manner that the quantity of electricity was 20 C/cm$^2$. The thus-etched stainless steel plates were immersed in 10% nitric acid, resulting in the formation of a passive film on the surface of the plates, followed by drying. The stainless steel plates for Sample Nos. 35 and 36 were not pretreated or etched.

The resulting etched or non-etched plates were coated with the resins shown in Table 8 by the methods shown Table 8 (dip coating or spin coating), followed by drying and baking. The coated plates thus prepared were shaped into a pot by pressing and evaluated for the cross-cut adhesion test in the same manner as in Example 1. The results of the evaluation are shown in Table 8.

TABLE 7

| Sample No. | Pretreatment | Etching |
|---|---|---|
| 33 | Blasting with FeCl$_3$ soln. glass beads** | yes |
| 34 | Blasting with FeCl$_3$ soln. glass beads** | yes |
| 35* | none | none |
| 36* | none | none |

Note:
*Samples Nos. 35 and 36 were comparative samples.
**Loss of weight in an amount corresponding to a thickness of 1.0 μm or more

TABLE 8

| Sample No. | Coated resin | Coating method | Cross-cut adhesion test |
|---|---|---|---|
| 33 | polyurethane[1] | dip coating | A 100/100 |
| 34 | Acrylic resin[2] | spin coating | A 100/100 |
| 35* | Polyurethane | dip coating | C 0/100 |
| 36* | Acrylic resin | spin coating | C 0/100 |

Note:
*Samples Nos. 35 and 36 were comparative samples.
[1]Polyurethane ("Crisvon" produced by Dainippon Ink And Chemicals, Inc.)
[2]Acrylic resin (water-dispersed acrylic resin, "Voncoat" produced by Dainippon Ink And Chemicals, Inc.)

As can be recognized from the above, the present invention provides a fluororesin-coated article in which excellent properties of the material of the coated layer are imparted to the stainless steel base used therein and the coating on the base has good adhesion to the base. In the case where the coated layer comprises rubber or plastics, post-processability after coating can be attained, which has been difficult to realize in the conventional coated articles. When the coated layer comprises a fluororesin composition, water repellency, anti-sticking property and stain resistance can be imparted to the stainless steel base used therein and the coating on the base can have good adhesion to the base and excellent heat-resistance. Particularly, the fluororesin-coated article according to the present invention has improved durability because of the increased adhesion of the coating on the surface of the base to the base in the article as compared to the adhesion in the conventional articles. Also, according to the present invention, good post-processability is attained in the fluororesin-coated article in which generally, it has heretofore been difficult to carry out post-processing thereon after the application of the coating.

While the present invention has been described in detail and with reference to the specific embodiments thereof, it will be apparent to one skilled in the art that various changes and modifications can be made therein without departing from the spirit and scope thereof.

What is claimed is:

1. A method for producing a coated article comprising a stainless steel base having an etched surface and having on said etched surface a coated layer, said method comprising the steps of:

sensitizing a stainless steel base through heating;

treating the resulting sensitized stainless steel base with an acid;

subjecting the resulting treated stainless steel base to etching;

subjecting the etched stainless steel base to a solution treatment through heating at 1,000° to 1,100° C.; and providing on the resulting etched surface of said stainless steel base a coated layer.

2. A method as claimed in claim 1, wherein said coated layer comprises rubber or plastics.

3. A method as claimed in claim 1, wherein said coated layer comprises a fluororesin alone or a layer comprising a fluororesin composition containing a fluororesin and a filler.

4. A method for producing a coated article comprising a stainless steel base having an etched surface and having on said etched surface a coated layer, said method comprising the steps of:

immersing a stainless steel base in an aqueous ferric chloride solution to cause the base to be dissolved to such an extent that the gloss of the surface of the base disappears;

subjecting the resulting stainless steel base to electrolytic etching; and providing on the resulting etched surface of said stainless steel base a coated layer.

5. A method as claimed in claim 4, wherein said coated layer comprises rubber or plastics.

6. A method as claimed in claim 4, wherein said coated layer comprises a fluororesin alone or a layer comprising a fluororesin composition containing a fluororesin and a filler.

7. A method for producing a coated article comprising a stainless steel base having an etched surface-and having on said etched surface a coated layer, said method comprising the steps of:

uniformly abrading the surface of a stainless steel base, through buffing or blasting, to the weight corresponding to a thickness of 1.0 μm or more of the base;

immersing the resulting stainless steel base in an aqueous acid solution or an aqueous ferric chloride solution to cause the base to be dissolved to such an extent that the gloss of the surface of the base disappears;

subjecting the resulting stainless steel base to electrolytic etching; and providing on the resulting etched surface of said stainless steel base a coated layer.

8. A method as claimed in claim 7, wherein said coated layer comprises rubber or plastics.

9. A method as claimed in claim 7, wherein said coated layer comprises a fluororesin alone or a layer comprising a fluororesin composition containing a fluororesin and a filler.

10. A method for producing a coated article comprising a stainless steel base having an etched surface and having on said etched surface a coated layer, said method comprising the steps of:

subjecting a stainless steel base to electrolytic etching at 15° C. or less; and providing on the resulting etched surface of said stainless steel base a coated layer.

11. A method as claimed in claim 10, wherein said coated layer comprises rubber or plastics.

12. A method as claimed in claim 10, wherein said coated layer comprises a fluororesin alone or a layer comprising a fluororesin composition containing a fluororesin and a filler.

13. A method for producing a coated article comprising a stainless steel base having an etched surface and having on said etched surface a coated layer, said method comprising the steps of:

subjecting a stainless steel base to electrolytic etching using a mixed aqueous solution of sulfuric acid and sodium chloride; and providing on the resulting etched surface of said stainless steel base a coated layer.

14. A method as claimed in claim 13, wherein said coated layer comprises rubber or plastics.

15. A method as claimed in claim 13, wherein said coated layer comprises a fluororesin alone or a layer comprising a fluororesin composition containing a fluororesin and a filler.

16. A method for producing a coated article comprising a stainless steel base having an etched surface and having on said etched surface a coated layer, said method comprising the steps of:

subjecting a stainless steel base to electrolytic etching at 15° C. or less and using a mixed aqueous solution of sulfuric acid and sodium chloride; and providing on the resulting etched surface of said stainless steel base a coated layer.

17. A method as claimed in claim 16, wherein said coated layer comprises rubber or plastics.

18. A method as claimed in claim 16, wherein said coated layer comprises a fluororesin alone or a layer comprising a fluororesin composition containing a fluororesin and a filler.

* * * * *